(12) United States Patent
Siegl et al.

(10) Patent No.: US 11,708,473 B2
(45) Date of Patent: Jul. 25, 2023

(54) METHOD FOR PRODUCING A FOAMED GRANULATE AND USE THEREOF

(71) Applicant: Alpha Werke Alwin Lehner Gmbh & Co. KG, Hard (AT)

(72) Inventors: Robert Siegl, Dornbirn (AT); Andreas Weber, Thuringen (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 392 days.

(21) Appl. No.: 16/492,922

(22) PCT Filed: Mar. 2, 2018

(86) PCT No.: PCT/EP2018/055141
§ 371 (c)(1),
(2) Date: Sep. 10, 2019

(87) PCT Pub. No.: WO2018/162339
PCT Pub. Date: Sep. 13, 2018

(65) Prior Publication Data
US 2021/0269613 A1    Sep. 2, 2021

(30) Foreign Application Priority Data
Mar. 10, 2017    (CH) .................................... 00289/17

(51) Int. Cl.
*C08J 9/16* (2006.01)
*C08J 9/06* (2006.01)

(52) U.S. Cl.
CPC . *C08J 9/16* (2013.01); *C08J 9/06* (2013.01); *C08J 2201/024* (2013.01);
(Continued)

(58) Field of Classification Search
CPC . C08J 9/16; C08J 9/06; C08J 2201/024; C08J 2201/026; C08J 2201/03; C08J 2203/02; C08J 2203/10; C08J 2207/00; C08J 2300/12; C08J 2300/30; C08J 2367/02; C08J 2367/04; B29B 7/748;
(Continued)

(56) References Cited

U.S. PATENT DOCUMENTS 3,586,647 A * 6/1971 Kremer ...................... C08J 9/16
521/50
4,224,264 A    9/1980 Ort
(Continued)

FOREIGN PATENT DOCUMENTS

DE    1925028 A1    1/1970
DE    102004012579 A1    9/2005
(Continued)

*Primary Examiner* — Kara B Boyle
(74) *Attorney, Agent, or Firm* — Morriss O'Bryant Compagni Cannon, PLLC

(57) ABSTRACT

The invention relates to a method in which a polyester melt containing one or more polyesters is produced, the polyester melt being foamed by a blowing agent and a foamed granulate is produced from the foamed polyester melt. The intrinsic viscosity (IV) of the polyester melt is reduced by the blowing agent about at least 0.05 dl/g, measured according to ASTM D4603, and the IV of the foamed granulate is then increased by means of a solid phase polycondensation (SSP).

15 Claims, 1 Drawing Sheet

(52) U.S. Cl.
CPC ...... *C08J 2201/026* (2013.01); *C08J 2201/03* (2013.01); *C08J 2203/02* (2013.01); *C08J 2203/10* (2013.01); *C08J 2207/00* (2013.01); *C08J 2300/12* (2013.01); *C08J 2300/30* (2013.01); *C08J 2367/02* (2013.01); *C08J 2367/04* (2013.01)

(58) Field of Classification Search
CPC .... B29B 9/12; B29B 7/40; B29B 7/46; B29B 9/06; B29B 11/08; B29B 11/12; B29B 11/14973; B29B 2911/14993; B29B 7/007; B29B 9/10; B29B 2009/161; B29C 44/3461; B29C 48/0022; B29C 49/04; B29C 49/08; B29C 2049/001; B29C 2049/0094; B29K 2067/00; B29K 2067/003; B29K 2067/046; B29K 2105/0094; B29K 2995/0063; B29L 2007/00; B29L 2023/00; B29L 2031/005; B29L 2031/7132; C08L 67/00

See application file for complete search history.

(56) References Cited

U.S. PATENT DOCUMENTS

| | | | |
|---|---|---|---|
| 4,588,754 A * | 5/1986 | Liu | ............... C08J 9/10 |
| | | | 521/97 |
| 6,306,921 B1 | 10/2001 | Al Ghatta | |
| 2012/0165422 A1 | 6/2012 | Vernon | |

FOREIGN PATENT DOCUMENTS

| | | |
|---|---|---|
| KR | 20090082799 | 7/2009 |
| KR | 100955324 B1 | 4/2010 |

* cited by examiner

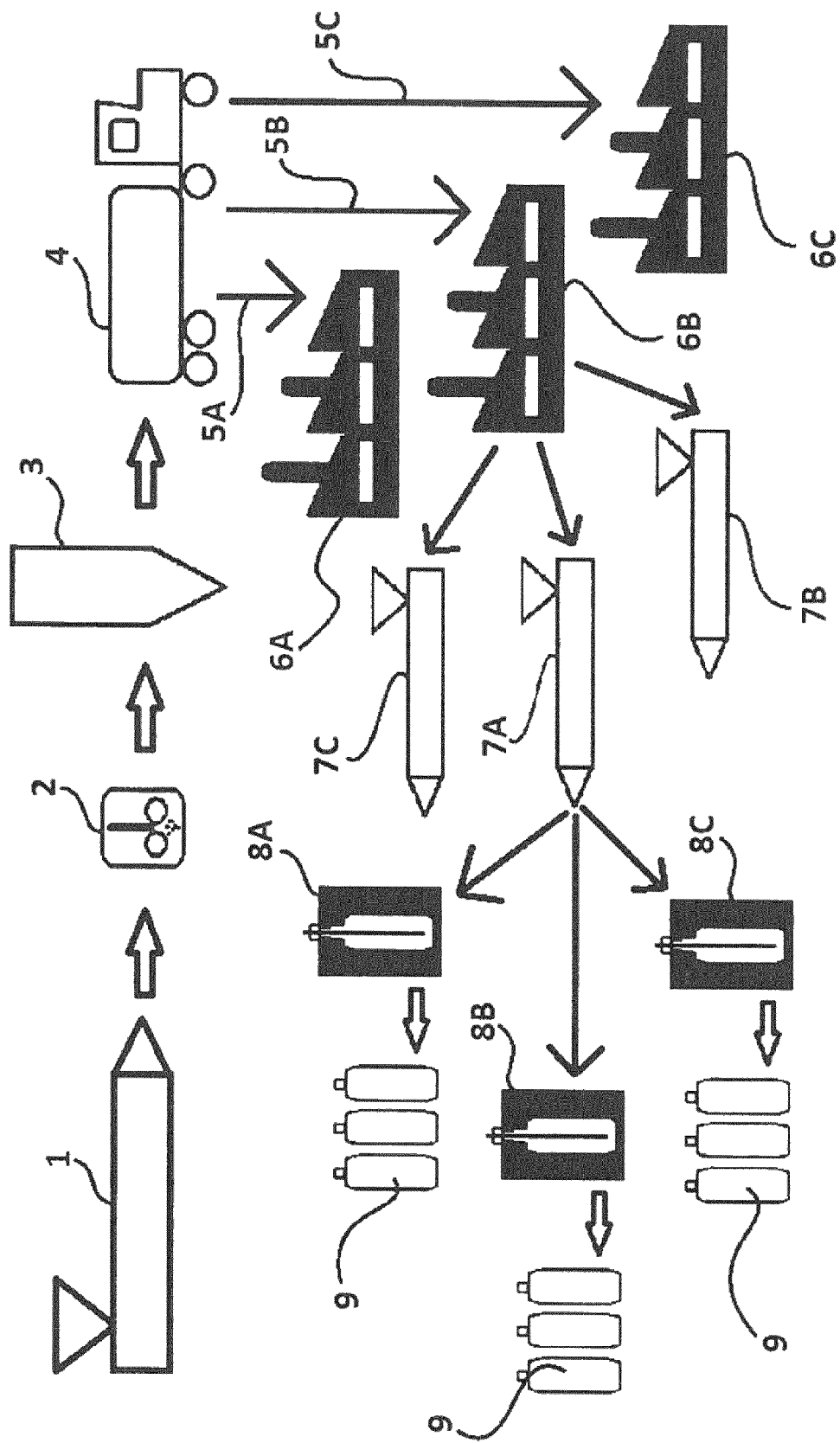

METHOD FOR PRODUCING A FOAMED GRANULATE AND USE THEREOF

CROSS-REFERENCE TO RELATED APPLICATIONS

This application is a national phase entry under 35 U.S.C. § 371 of PCT/EP2018/055141 filed Mar. 2, 2018, which claims priority to Swiss Patent Application No. 00289/17 filed Mar. 10, 2017, the entirety of each of which in incorporated by this reference.

TECHNICAL FIELD

The invention relates to the production of a foamed granulate and its use for the production of intermediates such as preforms and end products such as containers.

BACKGROUND ART

In the production of bottles, the use of polyesters has largely prevailed. On the one hand because the mechanical and physical properties (strength and barrier) of the material can be significantly improved through stretching and on the other hand because it can be recycled with low technical effort.

Difficult for recycling, however, are the variety of colors in which used polyester bottles are available. Once a bottle is colored with pigments (insoluble) or dyes (soluble), further processing is usually very limited, because the color cannot be removed in the typical recycling process. Oxidative discolorations are also usually irreversible.

Another problem area is the degradation of polyesters occurring during processing or in use, which results in a reduced intrinsic viscosity (IV) that can be led back to a decreased molecular chain length due to chain termination and chemical reactions. For example, blowing agents exist that lead to the release of water, wherein the water effects a chain breakage and degradation of the molecules in the polyester melt. The scientific literature therefore refers to use only those chemical blowing agents that form as little as possible water for foaming polycondensates. Instead, physical blowing agents (e.g. nitrogen or $CO_2$), the introduction of hollow particles (e.g. glass beads) or so-called "voiding" are used, where weaknesses result in the polymer matrix through introduced interference particles, which lead to cavities when stretching the material.

Advantages of the Invention

The present invention provides a method for producing a foamed granulate which is suitable for the production of preforms and containers.

SUMMARY OF THE INVENTION

The above advantages are solved by a method wherein a polyester melt containing one or more polyesters is produced, the polyester melt is foamed by a blowing agent, and a foamed granulate is produced from the foamed polyester melt.

Among other things, a method is disclosed, wherein a polyester melt containing one or more polyesters is produced, the polyester melt is foamed by a blowing agent and a foamed granulate is produced from the foamed polyester melt, wherein the intrinsic viscosity (IV) of the polyester melt is reduced by at least 0.05 dl/g by the blowing agent and/or by the foaming and the IV of the foamed granulate is increased by means of a solid state polycondensation ("solid state polycondensation" or "SSP").

In addition, a foamed polyester granulate is disclosed for use in injection molding machines and/or blow molding machines, which is produced from a polyester melt foamed by a blowing agent, wherein the IV of the foamed granulate was increased by means of a solid phase polycondensation (SSP) by at least 0.05 dl/g, measured according to ASTM D4603.

In addition, preforms and containers produced from foamed polyester granulate, as described in this document are disclosed. Hereby, a wall bounding the preform and/or the container is permeable to radiation incident on the preform and/or the container with a wavelength of 400 to 720 nm for a maximum of 30% or 40% or 50% of the incident radiation. The container can in this case be produced from this preform by blow or stretch blow molding.

Design variants of the invention may allow to influence the color and/or the radiation permeability of containers produced from the foamed granulate.

Features will be described below, wherein these (individually) are to be considered as advantageous features, even if they are not explicitly designated as such. The features shall be disclosed separately (as part of any granulate, preform, container or any method) and—if they do not exclude each other—in any combination. This includes the possibility of simultaneous realization of all described features.

In the method, a polyester melt containing one or more polyesters is produced.

The polyester melt consists of at least 85 percent by weight of the one or more polyesters from the group consisting of polyethylene terephthalate (PET), polyethylene naphthalate (PEN), polyethylene furanoate (PEF), polylactic acid (PLA), glycol-modified polyethylene terephthalate (PET-G), polypropylene furanoate (PPF) and copolymers of said polyesters.

It can be provided that the total content of polyesters in the polyester melt and/or in the foamed polyester melt is at least 80, 90 or 95 percent by weight.

The total content of polyesters in the polyester melt and/or the one or more polyesters in the polyester melt can, according to a variant, be at least 50, 60, 70, 80 or 90 percent by weight, or wherein substantially 100 percent by weight of the one and/or of the more polyesters consist of recycled polyester. Particularly advantageous, the addition of the blowing agent to the polyester melt and/or the foaming takes place in the extruder of a recycling plant and/or the foamed granulate is produced in a recycling plant.

It should be noted that the term "polyester melt" is understood to be a polyester melt with additives, but without blowing agent. The blowing agent may be added as a masterbatch between 1 percent by weight and 5 percent by weight.

The one or more polyesters in the polyester melt can be copolyesters or blends that are at least 80 percent by weight produced from the above polyesters.

The polyester melt can (or may not) already be and/or be dyed. The dyeing can be achieved by adding a colorant (pigments, dyes and mixtures thereof and mixtures of the aforementioned substances with solid or liquid carrier substances, typically designated as a "color concentrate" or "masterbatch").

The polyester melt is foamed by a blowing agent, whereby the foamed polyester melt is formed. The foaming of the polyester melt can take place in an extruder, in particular in the extruder of a recycling plant.

The foaming of the polyester melt ideally takes place by means of a chemical reaction and/or by means of a mechanical shearing action in an extruder, wherein the crystallizable polyester and/or the more crystallizable polyesters are heated to about 5° C. to 70° C. above the softening point or melting point.

The extruder can facilitate the gas formation in the polyester melt by means of compression and decompression zones. In the decompression zones, more polyester melt is conveyed than fed and a negative pressure is generated thereby. The polyester melt compressed in the compression zone can relax in these decompression zones. In the decompression zones, the pressure on the polyester melt drops and the saturation solubility of the blowing gas in the polyester melt is undercut. The excess blowing gas is gassed out from the polyester melt while forming bubbles, until an equilibrium has been reached under the prevailing pressure in the decompression zone.

It is desired that the blowing agent is a blowing agent which produces bubbles in the polyester melt and/or when developing its effect as a blowing agent (that is during foaming) and/or chemically reacts with the one or more polyesters and/or splits off water or another molecule (in particular in the form of a gas) with a mass of less than 200 daltons.

Blowing agents that result in more than 50 ppm of water are rather unsuitable for use in a polyester melt because the water in the polyester melt leads to chain breakage and degradation of the polymer molecules. However, this degradation during foaming is accepted in the present case. The IV is reduced by the degradation of the polyester melt. However, this takes place not in the extruder or the screw of the polyester production plant, but in a separate extruder, for example a recycling plant. After degradation, the foamed material is built up in an SSP reactor, that is, the IV is increased (e.g. in a SSP reactor under vacuum with or without inert gas such as nitrogen).

According to one variant, the blowing agent is a chemical blowing agent. The blowing agent can release a reactive molecular structure which degrades one or more polyesters, in particular molecules, radicals and/or gases having a molecular weight of less than 200 daltons. For example, the molecule may react with its free hydroxyl groups or its free carboxyl groups of the one or more polyesters.

Desirably, the blowing agent is not an inert blowing agent and/or a physical blowing agent.

The blowing agent may contain a nucleating agent for cell formation, in particular an inorganic substance as for example talc and/or chalk and/or titanium dioxide and/or calcium carbonate and/or a (different) mineral. The nucleating agent may be added to the polyester melt in a proportion of less than 10,000 ppm.

The blowing agent can contain sodium bicarbonate and/or potassium bicarbonate and/or disodium pyrophosphate and/or monocalcium orthophosphate and/or citric acid and/or citric acid derivatives.

As a powder, the blowing agent may consist of 100% of the individual components. As a masterbatch, due to the carrier, the proportion of the blowing agent decreases, as the carrier and the blowing agent are typically present as a mixture.

Less than 50 percent by weight, less than 25 percent by weight or less than 10 percent by weight of blowing agent based on the weight of the polyester melt can be admixed to the polyester melt.

It is provided that the intrinsic viscosity (IV) of the polyester melt is reduced by the blowing agent and/or by the foaming by at least 0.05, 0.07, 0.1 or 0.2 dl/g, but at most by 0.5 dl/g, measured according to ASTM D4603 and/or the volume of the polyester melt is increased by at least 2 or 5 or 10 percent and/or at most by 50, 30 or 20 percent. Alternatively or additionally, the IV and/or the volume of the polyester melt differs from that of the foamed polyester melt by the specified value.

Prior to foaming, the polyester melt can have an IV of at least 0.5, 0.6 or 0.7 and/or at most 1, 0.9 or 0.8 dl/g, measured according to ASTM D4603. Alternatively or additionally, the foamed polyester melt (that is, after foaming) can have an IV of at least 0.5 dl/g and/or at most 1.6 dl/g, measured according to ASTM D4603.

The foamed polyester melt and/or the foamed granulate can have bubbles of an average size (measured as the distance of the two most distant points of a bubble) of at least 0.050 micrometers and/or at most 500 microns generated by the blowing agent and/or foaming.

A foamed granulate can be produced from the foamed polyester melt. The volume of the foamed granulate can be higher than unfoamed granulate by at least 2 or 5 or 10 percent and/or at most 50, 30 or 20 percent, wherein the basis for producing the unfoamed granulate and the foamed granulate is the same polyester melt.

The IV and/or the material density of the foamed granulate is increased by solid state polycondensation ("solid state condensation", that is SSP) and namely by at least 0.05, 0.06 or 0.07 and/or at most 0.5 dl/g, measured according to ASTM D4603. Alternatively or additionally, the IV and/or the material density of the foamed granulate is higher by the specified value after carrying out the SSP than before carrying out the SSP.

The foamed granulate can have an IV and/or a material density of at least 0.5 dl/g and/or at most 1.6 dl/g, measured according to ASTM D4603 before carrying out the SSP. Alternatively or additionally, the foamed granulate can have an IV and/or a material density of at least 0.8 or 0.9 and/or at most 1.4 or 1.2 g/cm$^3$ after carrying out the SSP.

According to one design variant, the one or more polyesters in the polyester melt can essentially consist of PET, wherein the material density of the foamed granulate after the SSP is expediently less than 1.33 g/cm$^3$.

The foamed polyester granulate shall be disclosed for use in injection molding machines and/or blow molding machines.

A hose, a preform and a container produced from a foamed polyester melt and/or a foamed polyester granulate, as described in this document, are disclosed. Desired containers are bottles. Film can also be produced from the foamed polyester granulate. Containers can be formed by deep drawing from this film.

For example, a preform and/or a container can be produced by injection molding and/or blow molding. In particular, the preform can be heated by means of infrared radiation and be formed to a container by introducing a fluid under positive pressure into a corresponding machine by blow molding. Methods of blow molding are extrusion blow molding, stretch blow molding or injection blow molding. It is desirable if the foamed granulate or the foamed polyester melt is fed to the injection molding machine and/or to the corresponding blow molding machine for this purpose.

According to one aspect, it is provided that no further foaming and/or no further addition of a blowing agent takes place in the injection molding machine. Accordingly, the bubbles are already present in the foamed granulate and/or the foamed polyester melt when it is fed to the injection molding machine and/or the corresponding blow molding machine.

Stretched end products can also be produced from the hose produced from the foamed granulate or the foamed polyester melt or from the film produced from the foamed granulate or the foamed polyester melt (for example deep-drawn trays, stretched containers, extrusion-blown containers or stretched films), wherein the production of window profiles, preforms, tubes or deep draw sheets is also possible.

The polymer material (in particular in the form of a bulk material) which is fed to the injection molding machine and/or the blow molding machine can consist of the foamed granulate at least 1, 5, 10, 50, 80 or 90 percent by weight and/or at most 95, 80 or 60 percent by weight. Alternatively or additionally, a preform or a container can be produced from the foamed granulate in particular by injection molding and/or blow molding, wherein the proportion of the foamed granulate on the preform or container can correspond to the percentages by weight specified above. Alternatively or additionally, the mentioned polymer material and/or the preform and/or the container can, for example, contain non-recycled (and/or first) polyester material built up from monomers (for example virgin PET) in a proportion of at least 0 and/or at most 100 percent by weight.

If a relatively high proportion of more than 60 or 80 percent by weight of the polymer mass is formed from the foamed granulate, the weight of the container can for example be influenced in this manner.

If a relatively low proportion of for example than 1 or 10 percent by weight of the polymer mass is formed from the foamed granulate, a coloration (in particular a white coloration) of the preform and/or container to be produced can for example be achieved in this manner. This can reduce the amount of color that must be added to the polymer composition for whitening, or the addition of color can be completely dispensed with. According to one variant, white bottles are generated from recycled PET material, and may be without titanium oxide being used as pigment for this.

If a polyester bottle is colored with pigments (insoluble) or dyes (soluble), the possibilities for further processing are often severely restricted, because the paint cannot be removed by typical, simple recycling processes. By achieving color effects through cavities, respectively the bubbles mentioned above, within the object, recycling is greatly simplified. Interfaces of the bubbles scatter the incident radiation (for example solar radiation or artificial light), whereby the color impression in the eye of the observer is created by the wavelengths reflected by the object. The scattering again depends on the size of the bubbles. If the bubbles are very small, in particular very short wavelengths of the incident radiation are scattered. Thus, for example, UV radiation is scattered, while visible light can pass unhindered.

The influence of the scattering has, in addition to the coloring, the effect of protecting the product (filling material) in the container from radiation. Certain ingredients of a product such as vitamin B2 (riboflavin), which is e.g. contained in milk or in beer, can negatively affect the taste of the product when exposed to light. Protection against radiation in the wavelength range of 250 to 500 or 550 nm is particularly useful in this context.

However, the scattering can still be used in other ways. Of interest in connection with the invention is among other things a two-stage process for producing a container, where the preform is produced in a first machine and the preform is heated in a second machine by means of infrared radiation (IR) or near infrared radiation (NIR) before it is molded into the container (in particular by blowing and/or stretching). If the preform scatters radiation below the NIR or IR range (in particular smaller than 800 nm), the heating of the preform is not adversely affected thereby.

It can be provided that a wall bounding the preform and/or the container is permeable to radiation incident on the preform and/or the container with a wavelength of 400 to 720 nm for a maximum of 30% or 40% or 50% of the incident radiation. The preform and/or the container can be produced by an injection molding process or by an impact intrusion process. The container can also be produced from the preform by means of blowing or stretch blowing. Furthermore, the container can also be produced from the foamed granulate or the foamed polyester melt in blow molding, wherein a wall bounding the container is permeable to a radiation incident on the container having a wavelength of 400 to 720 nm for a maximum of 30% or 40% or 50% of the incident radiation. The bubbles produced in the preform and/or in the container by the foaming (and/or originating from the foamed granulate) can have a size by which this effect is achieved.

It is advantageous if the preform and/or the container (in particular its wall) lets through radiation of a wavelength of 800 to 2000 nanometers with at least 50, 70 or 80 percent. In particular, the bubbles produced in the preform and/or in the container by the foaming (and/or originating from the foamed granulate) can have a size by which this effect is achieved.

The container can be produced from the preform by blowing, in particular stretch blowing. The shape and size of the bubbles can be influenced by the selected stretch ratio, for example, when blowing and/or stretching the preform or when stretching a film. Furthermore, the size and shape of the bubbles can be influenced by the pressure curve, e.g. the injection pressure or the holding pressure during injection molding.

The size of the bubbles (cells) and thus the scattering of the radiation, can furthermore be influenced in that the foamed polyester melt and/or the molten foamed granulate is passed through perforated sheets.

The size of the bubbles can also be influenced by the amount of the blowing agent added to the polyester melt and/or the grain size of the blowing agent.

Furthermore, the size of the bubbles can be influenced by adjustments on the extruder (especially the extruder of a recycling plant) such as the dynamic pressure, the temperature or the execution of a degassing.

In a recycling process, for example, either the bubbles can be removed by melt degassing and/or by the addition of additional blowing agents, additional bubbles (cells) of the polyester melt can be added and/or the size of the bubbles can be changed, for example by means of a pinhole aperture.

Desirably, the container has a density greater than 1 g/cm$^3$. According to a variant, the container can contain fillers, in particular mineral fillers such as chalk, talc or the like with a density greater than 1 g/cm$^3$.

Thus, by defining the bubble size, the scattering of natural or artificial light can be influenced at the interfaces of the bubbles, in particular to scatter UV light, scatter visible light, scatter or not scatter NIR radiation, or to generate color effects. In this way, for example, additives such as UV blockers, white pigments or dyes can be replaced. The recycling of polyesters without such additives is greatly simplified.

Terms in this document shall be understood in such a manner as would be understood by an expert in the field. If more interpretations are possible in the respective context, each interpretation shall be disclosed individually. In particular, in the event of unclarities, the definitions listed in this document can alternatively or additionally be used.

Information in this document regarding intrinsic viscosity (IV) may be measured according to ASTM D4603.

Information regarding the material density of the granulate may be measured according to ASTM D1505-10.

If an information regarding a standard is not clear, the most recent version of the standard and/or the valid version of the standard at the time of filing (filing date) is meant to be the designation most similar to the specified designation.

In addition, the following claims are additionally each disclosed with reference to any of the preceding claims ("according to any one of the preceding claims"), even if they are not claimed in this form.

BRIEF DESCRIPTION OF THE DRAWING

FIG. 1 is a flow chart illustrating a method of the invention.

DETAILED DESCRIPTION OF AN EXEMPLARY EMBODIMENT

FIG. 1 shows a flow chart. In a first step, only PET industrial waste from bottle production and PET flakes from post-consumer products as for example used PET bottles is fed to an extruder 1. At the same time, a masterbatch is fed to this polyester material, to which a blowing agent is added such as sodium bicarbonate and/or potassium hydrogen carbonate and/or disodium dihydrogen diphosphate and/or monocalcium orthophosphate and/or citric acid and/or citric acid derivatives. The weight proportion of the chemical blowing agent at the masterbatch is 40% in the present embodiment. The weight proportion of the masterbatch to the polyester melt is about 3% in the present example. By the extrusion process in the extruder 1, the fed material is melted to a polyester melt, wherein the weight proportion of one or more polyesters is at least 85%. The polyester or the polyesters consist of the group consisting of polyethylene terephthalate (PET), polyethylene naphthalate (PEN), polyethylene furanoate (PEF), polylactic acid (PLA), glycol-modified polyethylene terephthalate (PET-G), polypropylene furanoate (PPF) and copolymers of said polyesters. The chemical blowing agent acts as a nucleating agent for forming cells. Thus, when the polyester is molten, the chemical blowing agent reacts with the polyester melt and foams it. Prior to foaming, the polyester melt has an intrinsic viscosity of at least 0.6 dl/g, measured according to ASTM D4603. The intrinsic viscosity of the polyester melt is reduced by the blowing agent by at least 0.05 dl/g, measured according to ASTM D4603. The foamed polyester melt is formed into strands via nozzles and cooled in air or water. Subsequently, a rotating knife 2 cuts the strands into sections having a length of a few millimeters, the so-called granulate, which is foamed in the present embodiment and is present as spherical granulate. The foamed spherical granulate is fed, for condensation, to a solid phase condenser 3, which is also called Solid State Reactor (SSP) and which is located in a recycling plant. This increases the intrinsic viscosity. The intrinsic viscosity can be increased to about 1.6 dl/g, measured according to ASTM D4603, depending on the desired field of use. For the production of preforms, from which containers are blown or stretch blown in a second step, the intrinsic viscosity is increased to about 0.9 dl/g, measured according to ASTM D4603. The material density of the foamed spherical granulate is lower than 1.33 g/cm$^3$ and higher than 0.8 g/cm$^3$, measured according to ASTM D1505-19. It is understood that the foamed granulate can be food safe. The foamed granulate is transported to plants 6A, 6B, 6C processing polyester granulate. This is illustrated by the stylized truck 4, of which three arrows 5A, 5B, 5C point to these plants 6A, 6B, 6C. If necessary, unfoamed granulate can be added to the foamed granulate in the plants or also at the producer of the foamed granulate. Films can be produced in the plants, from which stretched end products can also be produced, as for example deep-drawn trays. The production of window profiles, pipes or deep-drawn sheets is possible. For example, containers are produced in the plant 6B. By means of an extruder 7A and a tool, not shown, preforms are produced, which are stretch blow molded in tools 8A, 8B, 8C of three stretch blow molding machines to containers, respectively bottles 9, which are subsequently supplied to a filling plant, not shown, for filling. By means of the extruder 7B, a hose is blown from granulate, which contains at least 1 percent by weight of foamed granulate, from which a container, such as a bottle, is extrusion-blown. By means of the extruder 7C, two different manufacturing methods for containers are to be symbolized. On the one hand, the containers are produced in an injection molding. On the other hand, injection molded parts are produced by injection molding, of which a predetermined range is blown. The containers manufactured with the different methods have an opaque white color and a wall bounding the container is permeable to a radiation incident on the container having a wavelength of 400 to 720 nm for a maximum of 30% or 40% or 50% of the incident radiation. Thus, by means of the containers, which are manufactured of foamed polyester granulate, the filling material can be protected from radiation. Certain ingredients of a product such as vitamin B2 (riboflavin), which is e.g. contained in the milk or in beer, can affect the taste of the product negatively when exposed to light. Protection against radiation in the wavelength range of 250 to 500 or 550 nm is particularly useful in this context. Thus, from foamed granulate, which may be obtained from PET recycling material, opaque white containers can be produced which prolong the shelf life of light-sensitive beverages without supplying such bottles with the previously used titanium oxide as a pigment. Due to the absence of this pigment, the bottles can easily be recycled after their use and thus be re-supplied to the described process.

The invention claimed is:

1. A method, comprising;
producing a polyester melt containing one or more polyesters;
foaming the polyester melt with a blowing agent, the foaming of the polyester melt taking place in an extruder of a recycling plant; and
producing a foamed granulate from the foamed polyester melt, wherein an intrinsic viscosity (IV) of the polyester melt is reduced by the blowing agent by at least 0.05 dl/g, measured according to ASTM D4603; and
increasing the IV of the foamed granulate by subjecting the foamed granulate to solid phase polycondensation (SSP).

2. The method according to claim 1, wherein the blowing agent splits off water or another molecule with a mass less than 200 Daltons in the polyester melt.

3. The method according to claim 1, wherein an injection molding machine is used to process a polymer mass comprising at least 1 percent by weight of the foamed granulate to produce a preform or a container from the polymer mass and the foamed granulate with the injection molding machine.

4. The method according to claim 3, wherein the polymer mass comprises between 1 percent and 10 percent of the foamed granulate and as a result produces a white coloration in the container.

5. The method according to claim 3, wherein the polymer mass comprises between 1 percent and 10 percent of the foamed granulate and as a result produces a white container.

6. The method according to claim 3, wherein the blowing agent comprises between 1 percent and 5 percent by weight of the foamed polyester melt.

7. The method according to claim 1, wherein the polyester melt has an IV of at least 0.6 dl/g, measured according to ASTM D4603, prior to foaming.

8. The method according to claim 1, wherein the IV of the foamed granulate is increased by more than 0.05 dl/g, measured according to ASTM D4603, by means of the SSP.

9. The method according to claim 1, wherein the one or more polyesters in the polyester melt comprise recycled polymer of least 80 percent by weight, 90 percent by weight or substantially 100 percent by weight.

10. The method according to claim 1, wherein the polyester melt comprises at least 85 percent by weight of the one or more polyesters from the group consisting of polyethylene terephthalate (PET), polyethylene naphthalate (PEN), polyethylene furanoate (PEF), polylactic acid (PLA), glycol-modified polyethylene terephthalate (PET-G), polypropylene furanoate (PPF), or copolymers of said one or more polyesters.

11. The method according to claim 1, wherein the one or more polyesters in the polyester melt comprise PET, wherein the material density of the foamed granulate, measured according to ASTM D1505-10, is less than 1.33 $g/cm^3$ after the SSP.

12. The method according to claim 1, wherein a material density of the foamed granulate, measured according to ASTM D1505-10, is higher than 0.8 $g/cm^3$ after the SSP.

13. The method according to claim 1, wherein the blowing agent is a chemical blowing agent splitting off a reactive molecular structure having a molecular weight of less than 200 Daltons.

14. The method according to any one of claim 1, wherein the chemical blowing agent has nucleating agents for cell formation.

15. The method according to claim 1, wherein the blowing agent contains one or more of sodium bicarbonate, potassium bicarbonate, disodium dihydrogen diphosphate, monocalcium orthophosphate, citric acid, or citric acid derivatives.

* * * * *